United States Patent [19]

Osawa et al.

[11] 4,346,139
[45] Aug. 24, 1982

[54] HIGHLY WEATHER-PROOF HIGH STRENGTH TRI-AXIAL WOVEN MEMBRANE MATERIALS

[75] Inventors: Yoshitaka Osawa; Akira Nishimura; Shinichi Toyooka, all of Osaka, Japan

[73] Assignee: Sumitomo Electric Industries, Ltd., Osaka, Japan

[21] Appl. No.: 221,750

[22] Filed: Dec. 31, 1980

[30] Foreign Application Priority Data

Mar. 7, 1980 [JP] Japan .................................. 55/29514

[51] Int. Cl.³ .......................... B32B 7/00; B32B 27/00
[52] U.S. Cl. ..................................... 428/252; 428/257;
428/267; 428/336; 428/339; 428/341; 428/421;
428/423.3; 428/423.5; 428/424.6; 428/474.4
[58] Field of Search ............... 428/252, 257, 267, 421,
428/423.5, 474.4, 423.3, 424.6, 336, 339, 341;
139/383 R

[56] References Cited

U.S. PATENT DOCUMENTS 3,446,251  5/1969  Dow ............................... 139/383 R
3,974,989  8/1976  Goodfellow ........................ 428/252

*Primary Examiner*—Marion McCamish
*Attorney, Agent, or Firm*—Sughrue, Mion, Zinn, Macpeak & Seas

[57] ABSTRACT

A highly weather-proof high strength membrane material which comprises
a polyvinyl fluoride resin film coated with an adhesive layer on one side thereof,
a urethane resin applied by spraying on the adhesive layer,
a triaxially woven fabric of polyaramide fibers as reinforcing fibers adhered on one surface thereof onto the sprayed urethane layer, and
a urethane resin applied by spraying on another surface of the fabric. This membrane causes creases to occur with difficulty and does not deteriorate radio wave permeability.

13 Claims, 4 Drawing Figures

4,346,139

HIGHLY WEATHER-PROOF HIGH STRENGTH TRI-AXIAL WOVEN MEMBRANE MATERIALS

BACKGROUND OF THE INVENTION

The present invention relates to highly weather-proof high strength membrane materials such as membrane materials for radomes, etc.

A radome is a dome which is permeable to radio waves and which is used to cover transmission-reception equipment.

At present, as membrane materials of this kind, those which are produced by covering a biaxially woven fabric of polyaramide fibers 6 with a rubber material 7, etc., as shown in FIGS. 3 and 4 of the accompanying drawings have been used. These membrane materials, however, have problems in that (1) creases are generated by the biaxially woven fabric, because they are bonded to triangular frames and (2) permeability to radio waves decreases due to wetting of ethylene-propylene rubber and absorption of water thereby.

SUMMARY OF THE INVENTION

An object of the present invention is to remove the above described problems of the prior art radomes.

The present invention provides a highly weather-proof high strength membrane material which comprises a polyvinyl fluoride resin film coated with an adhesive layer on one side thereof, a urethen resin applied by spraying on the adhesive layer, a triaxially woven fabric of polyaramide fibers as reinforcing fibers adhered on one surface thereof onto the sprayed urethane layer, and a urethane resin applied by spraying on another surface of the fabric.

Figure 1:
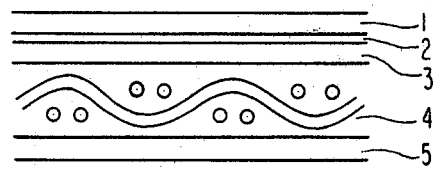
FIG. 1 shows a sectional plan of a membrane material of the present invention.

In the figures, reference numeral 1 is a polyvinyl fluoride resin film, 2 is an adhesive, 3 is sprayed urethane resin, 4 is a triaxially woven fabric of polyaramide fibers, 5 is sprayed urethane resin, 6 is a biaxially woven fabric of polyaramide fibers, and 7 is a rubber material.

DETAILED DESCRIPTION OF THE INVENTION

The present invention is further illustrated by reference to the following drawings. However, the present invention is not to be construed as being limited thereto.

Figure 2:
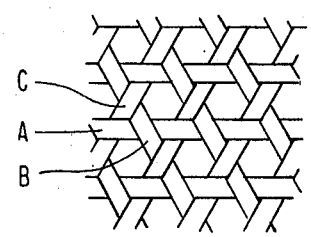
FIG. 2 shows a ground plan of a triaxially woven fabric of polyaramide fibers used for the membrane material of FIG. 1.
Figure 3:
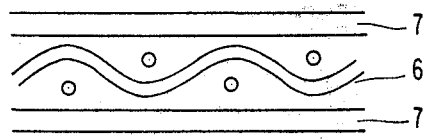
FIG. 3 shows a sectional plan of a prior art membrane material.
Figure 4:
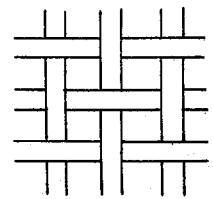
FIG. 4 shows a ground plan of a biaxially woven fabric of polyaramide fibers used for the membrane material of FIG. 3.

FIG. 1 is a sectional plan of a membrane material of the present invention, and FIG. 2 is an explanatory ground plan of a triaxially woven fabric used for the membrane material of the present invention.

In FIG. 1, 1 is a polyvinyl fluoride resin film, 2 is an adhesive, 3 is sprayed urethane resin, 4 is a triaxially woven fabric of polyaramide fibers, and 5 is sprayed urethane resin. In FIG. 2, (A), (B) and (C) show filaments of polyaramide fibers in each direction.

The polyvinyl fluoride resin film 1 has a thickness of 10 to 100$\mu$, preferably 25 to 50$\mu$ and is made of polyvinyl fluoride resin preferably having a specific gravity of 1.4 to 1.5 and a melting point of not less than 300° C. One surface of the resin film 1 is coated with an adhesive 2. Suitable examples of the adhesive 2 include polyurethane based adhesives. Suitable coating amount of the adhesive is usually from 5 to 100 g/m$^2$, preferably from 10 to 30 g/m$^2$.

A urethane resin is sprayed on the adhesive layer thus formed. Suitable example of the urethane resin layer 3 is a liquid polyurethane resin, which is sprayed in an amount of from 50 to 1,000 g/m$^2$, preferably from 100 to 300 g/m$^2$.

In the membrane materials of the present invention, polyaramide fibers which serve as a reinforcing fiber are used in the form of a triaxially woven fabric 4 in which creases occur with difficulty and discrepancy of meshes is minimized, etc. The fabric is adhered on the sprayed urethane resin 3.

Suitable example of the polyaramide fibers which can be used for preparing a triaxially woven fabric 4 includes "Cabler 29", a registered trademark for a product manufactured by E. I. Du Pont de Nemours and Company. The diameter of the fiber can be determined freely depending on practical purposes. Although the angles of the three axes employed for achieving a triaxially woven fabric may be determined depending on practical purposes, preferred one is 60° between any two axes.

To the free surface of this woven fabric, urethane resin 5 is applied by spraying so as to provide abrasion resistance without increasing total weight too much. The same urethane resin as that used for forming the urethane resin 3 can be used as the material for the urethane resin 5.

According to the present invention, a polyvinyl fluoride resin with good water repelling properties and good weather-proofing properties which is neither wet by nor absorbs water is provided as the outermost layer when in use. Thus, the above described problems in the prior art membrane materials have been eliminated or minimized.

The present invention as described above has the following advantages.

(1) Creases are difficult to generate, because the triaxially woven fabric is fixed to the triangular frames.

(2) Radio wave permeability does not deteriorate, because the water repelling property and the weather-proofing property are improved by use of the polyvinyl fluoride resin.

(3) The weight is light and the abrasion resistance is excellent, because the urethane resin is sprayed thereon instead of using much heavier materials.

The membrane materials of the present invention can be used for various kinds of highly weather-proof, high strength membrane materials in addition to use as radomes.

While the invention has been described in detail and with reference to specific embodiments thereof, it will be apparent to one skilled in the art that various changes and modifications can be made therein without departing from the spirit and scope thereof.

What is claimed is:

1. A highly weather-proof high strength membrane material which comprises a polyvinyl fluoride resin film coated with an adhesive layer on one side thereof, a urethane resin applied by spraying on the adhesive layer, a triaxially woven fabric of polyaramide fibers as reinforcing fibers adhered on one surface thereof onto the sprayed urethane layer, and a urethane resin applied by spraying on another surface of the fabric.

2. The material as claimed in claim 1, wherein said polyvinyl fluoride resin has a specific gravity of 1.4 to 1.5.

3. The material as claimed in claim 1, wherein the polyvinyl fluoride resin used in said polyvinyl fluoride resin has a melting point of not less than 300° C.

4. The material as claimed in claim 1, wherein the adhesive used in said adhesive layer is a polyurethane based adhesive.

5. The material as claimed in claim 1, wherein the urethane resin in said urethane resin layer is a liquid polyurethane resin.

6. The material as claimed in claim 1, wherein said polyvinyl fluoride resin film has a thickness of from about 10 to about 100μ.

7. The material as claimed in claim 1, wherein said polyvinyl fluoride resin film has a thickness of from 25 to 50μ.

8. The material as claimed in claim 1, wherein said adhesive is coated in an amount of from about 5 to about 100 g/m².

9. The material as claimed in claim 1, wherein said adhesive is coated in an amount of from 10 to 30 g/m².

10. The material as claimed in claim 1, wherein said urethane resin is sprayed in an amount of from about 50 to 1,000 g/m².

11. The material as claimed in claim 1, wherein said urethane resin is sprayed in an amount of from 100 to 300 g/m².

12. The material as claimed in claim 1, wherein the axes of said triaxially woven fabric cross with each other at an angle of 60°.

13. The material as claimed in claim 1, wherein the side of said polyvinyl fluoride resin opposite that coated with adhesive is not coated.

* * * * *